(12) United States Patent
Vey

(10) Patent No.: US 7,228,930 B1
(45) Date of Patent: Jun. 12, 2007

(54) THREE WHEEL MOTORCYCLE CONVERSION ASSEMBLY

(75) Inventor: Jeffrey L. Vey, 301 Princess St., Whitehouse, TX (US) 75791

(73) Assignee: Jeffrey L. Vey, Troup, TX (US)

(*) Notice: Subject to any disclaimer, the term of this patent is extended or adjusted under 35 U.S.C. 154(b) by 491 days.

(21) Appl. No.: 10/909,674

(22) Filed: Aug. 2, 2004

Related U.S. Application Data

(63) Continuation-in-part of application No. 10/231,709, filed on Aug. 30, 2002, now Pat. No. 6,964,314.

(60) Provisional application No. 60/592,573, filed on Jul. 31, 2004.

(51) Int. Cl.
B62D 61/06 (2006.01)

(52) U.S. Cl. ............... 180/210; 180/53.3; 180/209; 180/215; 180/219; 280/416.2

(58) Field of Classification Search .......... 180/210, 180/219, 53.3, 227, 209, 215, 216, 217; 280/416.2, 280/7.15, 282, 284, 288, 124.128
See application file for complete search history.

(56) References Cited

U.S. PATENT DOCUMENTS

| 4,325,449 A | 4/1982 | D'Addio et al. |
|---|---|---|
| 4,392,536 A | 7/1983 | Iwai et al. |
| 4,463,964 A | 8/1984 | Takayanagi et al. |
| 4,582,157 A | 4/1986 | Watanabe |
| 4,673,053 A | 6/1987 | Tanaka et al. |
| 5,499,689 A | 3/1996 | Johnson |
| 5,692,577 A | 12/1997 | Dornbusch et al. |
| 5,884,717 A | 3/1999 | Lehman et al. |
| 5,899,291 A | 5/1999 | Dumais |
| 6,378,644 B1 | 4/2002 | Brown et al. |
| 6,547,027 B1 | 4/2003 | Kalhok et al. |
| 6,964,314 B1 * | 11/2005 | Vey .................. 180/209 |

* cited by examiner

*Primary Examiner*—Eric Culbreth
(74) *Attorney, Agent, or Firm*—Jones, Walker, Waechter, Poitevent, Carrere, & Denegre, L.L.P.

(57) ABSTRACT

A mounting assembly for converting a two wheel vehicle to a three wheel vehicle. The mounting assembly includes a swing arm assembly having two arms connected by an intermediate member with each of the arms having a pivotal connector attached to one of their ends. A third link has a first end pivotally connected to the intermediate member and a second end free of the swing arm assembly. The mounting assembly may be adapted to fit the frames of Harley Davidson V-Rod model motorcycles by using arm extensions that connect the swing arm shaft assembly to the frame of the motorcycle.

19 Claims, 7 Drawing Sheets

THREE WHEEL MOTORCYCLE CONVERSION ASSEMBLY

This application is a continuation-in-part of U.S. application Ser. No. 10/231,709 filed on Aug. 30, 2002 now U.S. Pat. No. 6,964,314 and this application claims priority to U.S. Application Ser. No. 60/592,573 filed on Jul. 31, 2004, both of which are incorporated by reference herein in their entirety.

I. BACKGROUND OF INVENTION

The present invention generally relates to methods and devices for converting two wheel motorcycles into three wheel motorcycles and in particular relates to an assembly for attaching the frame of a motorcycle to a two wheel axle.

Three wheel motorcycles or tricycles are becoming increasingly popular and there are numerous methods of connecting the frame of a two wheel motorcycle to a two wheel axle assembly in order to construct the three wheel motorcycle. Two examples of these methods may be seen in U.S. Pat. Nos. 5,884,717 and 5,499,689. Devices such as in U.S. Pat. No. 5,884,717 fix the two wheel axle assembly to the motorcycle frame in a very rigid manner. When such a three wheel motorcycle makes a turn, there is no possibility of sideways movement of the rear axle relative to the frame. This arrangement results in a stiffer and less forgiving ride. U.S. Pat. No. 5,499,689 improves this situation by connecting the motorcycle frame to the axle assembly with joints which may pivot to some degree. While the device in U.S. Pat. No. 5,499,689 operates well with some motorcycles, it is not as satisfactory with other motorcycles, such as many Harley Davidson models, which tend to experience more vibration.

II. SUMMARY OF THE INVENTION

The present invention provides a mounting assembly for converting a two wheel vehicle to a three wheel vehicle. One embodiment of the mounting assembly comprises a swing arm assembly having two arms connected by an intermediate member with each of the arms having a pivotal connector attached to one of their ends. A third link has a first end pivotally connected to the intermediate member and a second end free of the swing arm assembly. Another embodiment of the mounting assembly is adapted to fit the frames of Harley Davidson V-Rod model motorcycles and comprises a swing arm shaft assembly and arm extensions whereby the arm extensions connect the swing arm assembly to the frame of the motorcycle.

III. BRIEF DESCRIPTION OF THE DRAWINGS

IV. DETAILED DESCRIPTION

Figure 1:
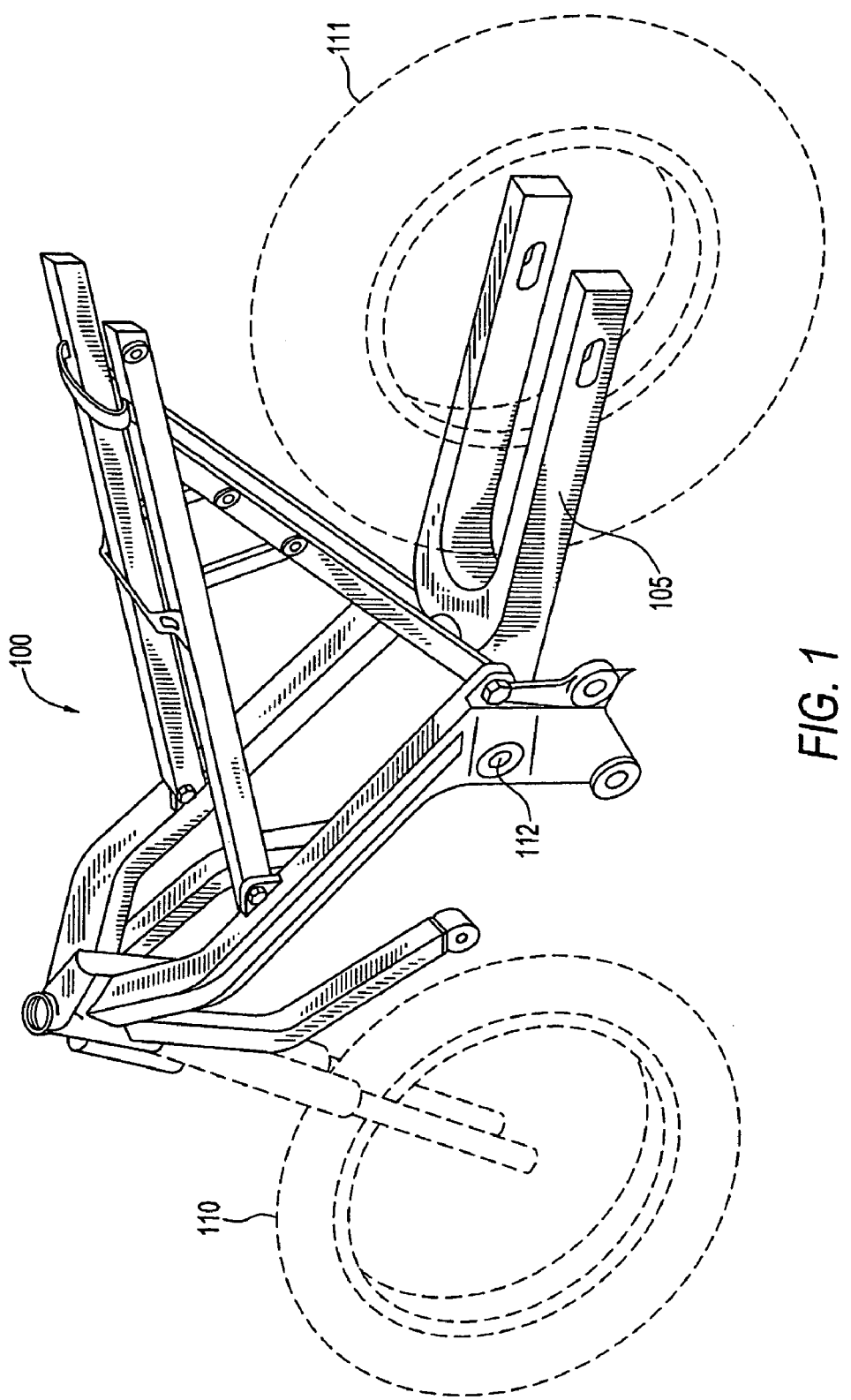
FIG. 1 is a perspective view of a prior art motorcycle frame and swing arm.

FIG. 1 illustrates a prior art motorcycle frame 100. Attached to the front of frame 100 will be a front wheel 110 and attached to the rear of frame 100 will be a swing arm 105 which supports rear wheel 111. Conventional swing arm 105 will be pivotally attached to frame 100 by frame pin 112 although in practice the suspension system (not shown) will keep swing arm 105 from pivoting freely. Typically, when conventional two wheel motorcycles are converted to three wheel motorcycles, it is the conventional swing arm 105 which is removed and replaced with some type of swing arm or ladder bar assembly which forms the connection between the conventional motorcycle frame 100 and the two wheel axle assembly.

Figure 2:
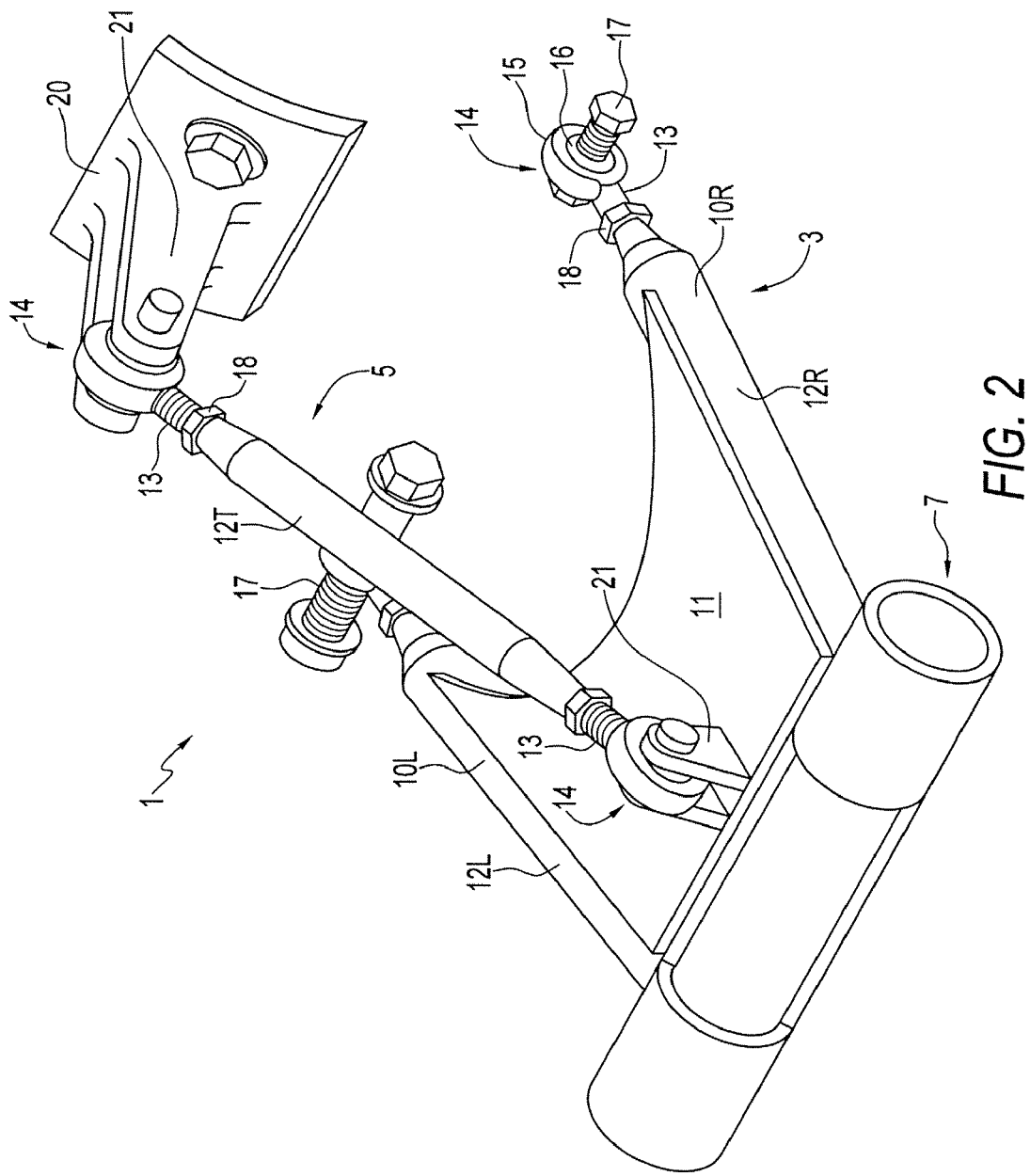
FIG. 2 is a perspective view of the mounting assembly of the present invention.

The present invention comprises a novel mounting assembly which provides a means for pivotally connecting the frame of a conventional motorcycle to a two wheel rear axle assembly, thereby transforming the conventional motorcycle into a three wheel motorcycle. FIG. 2 shows a perspective view of mounting assembly 1 and its two main components, swing arm 3 and third link 5. Swing arm 3 will include a pivoting frame connector 7 which is generally tubular and sized such that the frame pin 112 seen in FIG. 1 can engage frame connector 7 and pivotally secure swing arm 3 to frame 100 in the same manner as prior art swing arms. In particular, frame connector 7 is designed to accommodate the bushing system used with most Harley Davidson frame pins. Extending from frame connector 7 are right arm 10R and left arm 10L. Further, arms 10R and 10L will be rigidly attached to frame connector 7 by a conventional means such as welding. Arms 10R and 10L will generally comprise an outer tube 12R which attaches to frame connector 7 and an internal threaded shaft 13 which threadedly engages outer tube 12R such that threaded shaft 13 may extend out of and retract into outer tube 12R. The end of threaded shaft 13 extending from outer tube 12 will have a pivotal connector 14 positioned thereon. In the embodiment shown, pivotal connector 14 is a conventional "Heim joint" which is formed of an eye ring 15 and a swivel ball 16 positioned within eye ring 15. When Heim joint 14 is positioned (by rotating threaded shaft 13) the desired distance from the end of outer tube 12R, lock nut 18 will be rotated against the end of outer tube 12R and lock Heim joint 14 in that position. While partially hidden from view in FIG. 2, it will be understood that the components of arm 10L are identical to those seen and described in 10R. Arms 10R and 10L will be joined by an intermediate member such as connector plate 11. Connector plate 11 will extend between and be firmly attached (such as by welding) to frame connector 7, arm 10L and arm 10R, thereby rigidly positioning these elements with respect to one another. However, the present invention is also intended to encompass intermediate members other than connector plate 11 which may not be rigidly attach to the arms 10R and 10L and/or frame connector 7.

The second major component of mounting assembly 1 is third link 5. Third link 5 is similar to arms 10L and 10R in that it comprises an outer tube 12 with threaded shafts 13 extending therefrom and pivotal connectors 14 on the end of threaded shafts 13. However, it can be seen that third link 5 is a turn buckle type of assembly which has a separate threaded shaft 13 on each end of outer tube 12T. It will be understood that rotation of the outer tube 12T in one direct will cause the pivotal connectors 14 to move away from one another while rotation of outer tube 12T in the opposite direction will cause connectors 14 to move toward one another. In other words, the effective length of third link 5 may be lengthened or shortened by rotation of outer tube 12T. As described above, lock nuts 18 will serve to lock the degree to which threaded shafts 13 extend from outer tube 12T. Third link 5 will be connected to swing arm 3 by a way of a pair of ears 21 which are attached to connector plate 11. While removed from FIG. 2 for clarity, it will be understood that a pin or bolt such as the pin 17 on arm 10R's Heim joint 14 will pivotally connect third link 5 to ears 21 and thus to connector plate 11. The end of third link 5 which is opposite connector plate 11 will likewise engage a pair of ears 21. However, this pair of ears 21 is connected to a mounting plate 20 which will be explained in more detail below.

Figure 3:
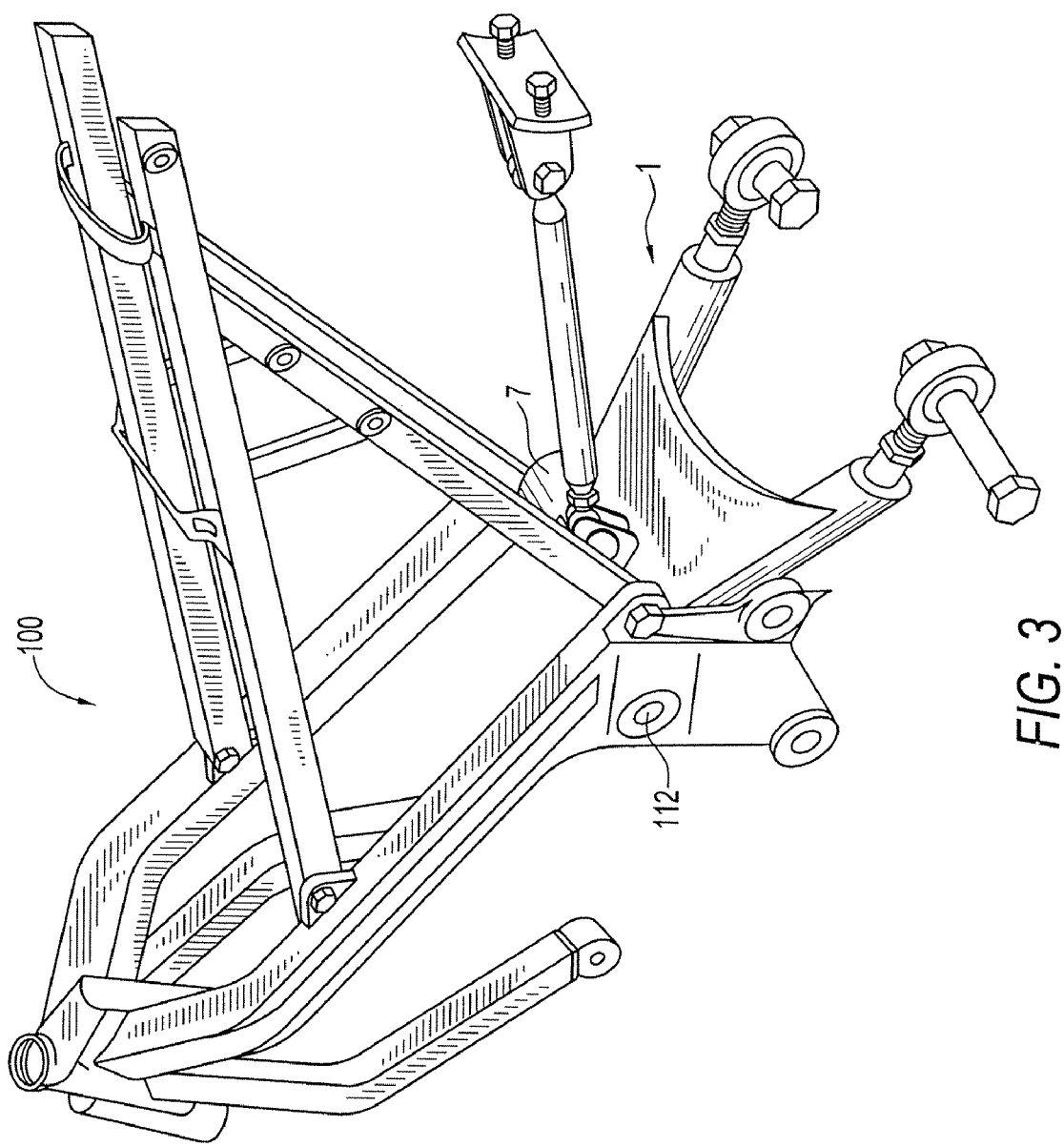
FIG. 3 is a perspective view of the mounting assembly connected to a motorcycle frame.

FIG. 3 illustrates how mounting assembly 1 will be connected to the frame 100 of a motorcycle. The existing frame pin 112 will engage frame connector 7 in the same manner that pin 112 engaged the prior art swing arm 105 seen in FIG. 1. As mentioned above, whatever type of bushing or bearing assembly supports the pivotal engagement of swing arm 105 by pin 112 will typically be utilized in the same manner in the connection between frame connector 7 and pin 112.

Figure 4:
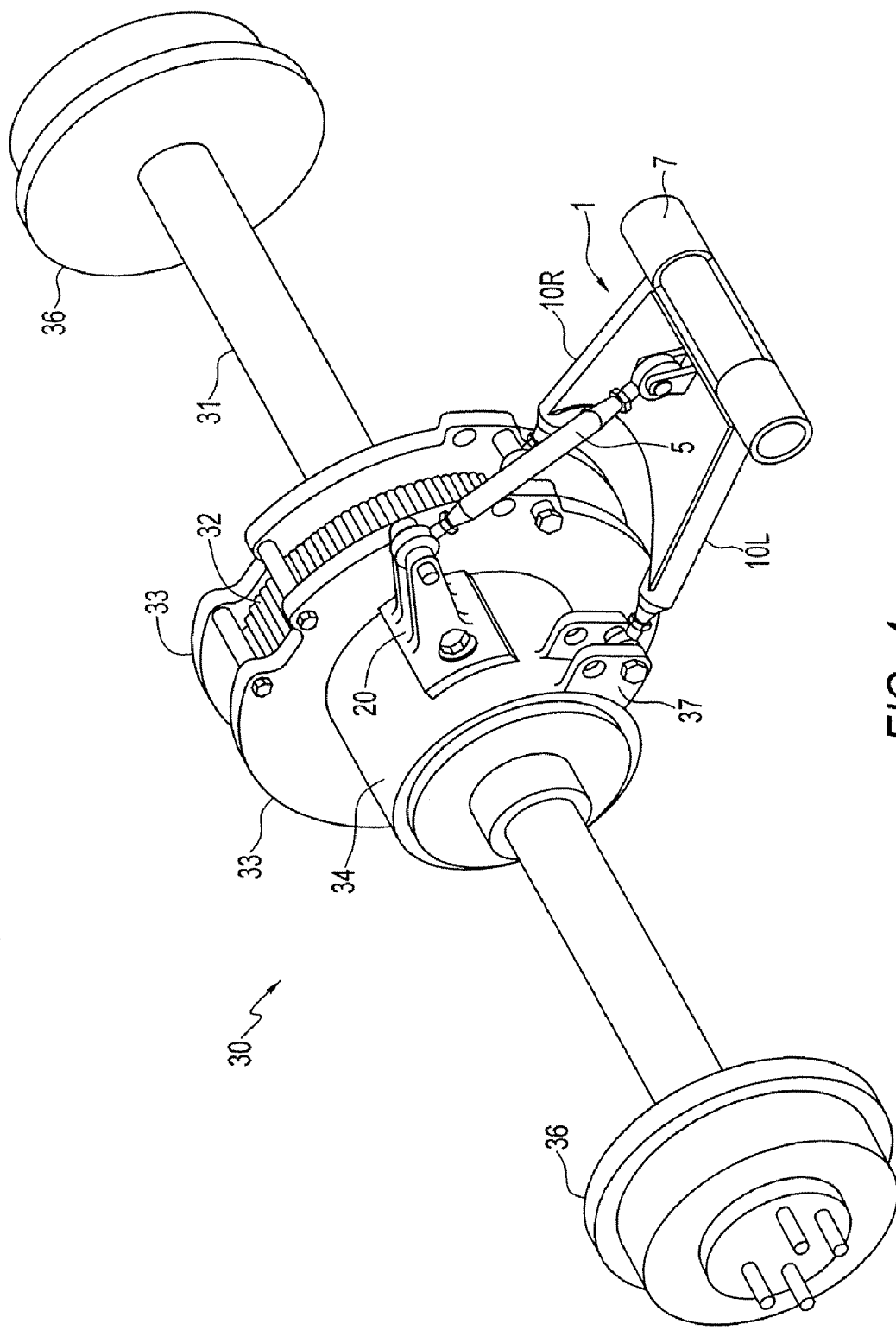
FIG. 4 is a perspective view of the mounting assembly connected to a two wheel rear axle assembly.

The manner of connecting the two wheel rear axle assembly 30 to mounting assembly 1 is shown in FIG. 4. Rear axle assembly 30 will generally comprise an axle 31, wheel hubs 36, and a drive gear housing 34. In the embodiment shown, rear axle assembly 30 is of the type which will be powered by a conventional motorcycle drive belt. Therefore, rear axle assembly 30 includes a belt gear 32 positioned between two belt gear side plates 33. Rear axle assembly 30 is known in the art and available from manufactures such as Motor Trike, Inc. located in Troup, Tex. and does not in and of itself form part of the present invention.

As clearly shown in FIG. 4, mounting plate 20 will be bolted to drive gear housing 34 while arm 10L is pinned to a pair of gear housing ears 37 and arm 10R is pinned to belt gear side plates 33. After arms 10R and 10L are pinned to rear axle assembly 30, threaded shafts 13 may be extended if necessary to provide a gross adjustment to drive belt tension. Additionally, threaded shafts 13 may be adjusted relative to one another to ensure that the rear wheels are properly aligned in the correct parallel orientation with the front wheel. Thereafter, third link 5 may be lengthened as need to provide a finer degree of tightening to the drive belt.

It will be readily apparent how mounting assembly 1 provides a three point pivotal connection to rear axle assembly 30, with the arms 10R, 10L, and third link 5 each providing a means for pivotally and extendably attaching to rear axle assembly 30. It can be conceptualized how mounting frame 1 will function in a three wheel motorcycle. When both rear wheels are raised on a road surface, for example as in going over a speed bump, rear axle assembly 30 is allowed some degree of pivoting motion (of course limited by the suspension system) relative to frame 100 due to frame connector 7 being pinned to frame 100 at pin 112 (see FIG. 3). Nevertheless, the three point connection between mounting assembly 1 and rear axle assembly 30 prevents mounting assembly 1 from having any degree of rotation relative to rear axle assembly 30 around the axis of rear axle 31. On the other hand, when the three wheel motorcycle is subject to side load forces, such as when traveling through a curve or turn, frame connector 7 cannot move relative to the frame in a sideways direction. However, because all three attachment points between mounting assembly 1 and rear axle assembly 30 are pivotal connections, there can be a slight sideways turning of rear axle assembly 30 relative to mounting assembly 1. Additionally, when one rear wheel is raised slightly by a small bump or irregularity in the roadway, the pivotal connections allow a slight rotation around the axis which is perpendicular to the axle 31 and parallel to the roadway surface. While this turning and rotation described above are small in magnitude, they have a significant effect on the feel of the ride. The pivotal connections give mounting assembly 1 the feel of an independent suspension system while providing the stability of a solid axle. Another significant advantage of the three point connection to the rear axle assembly 30 is the reduction of vibration.

Figure 5:
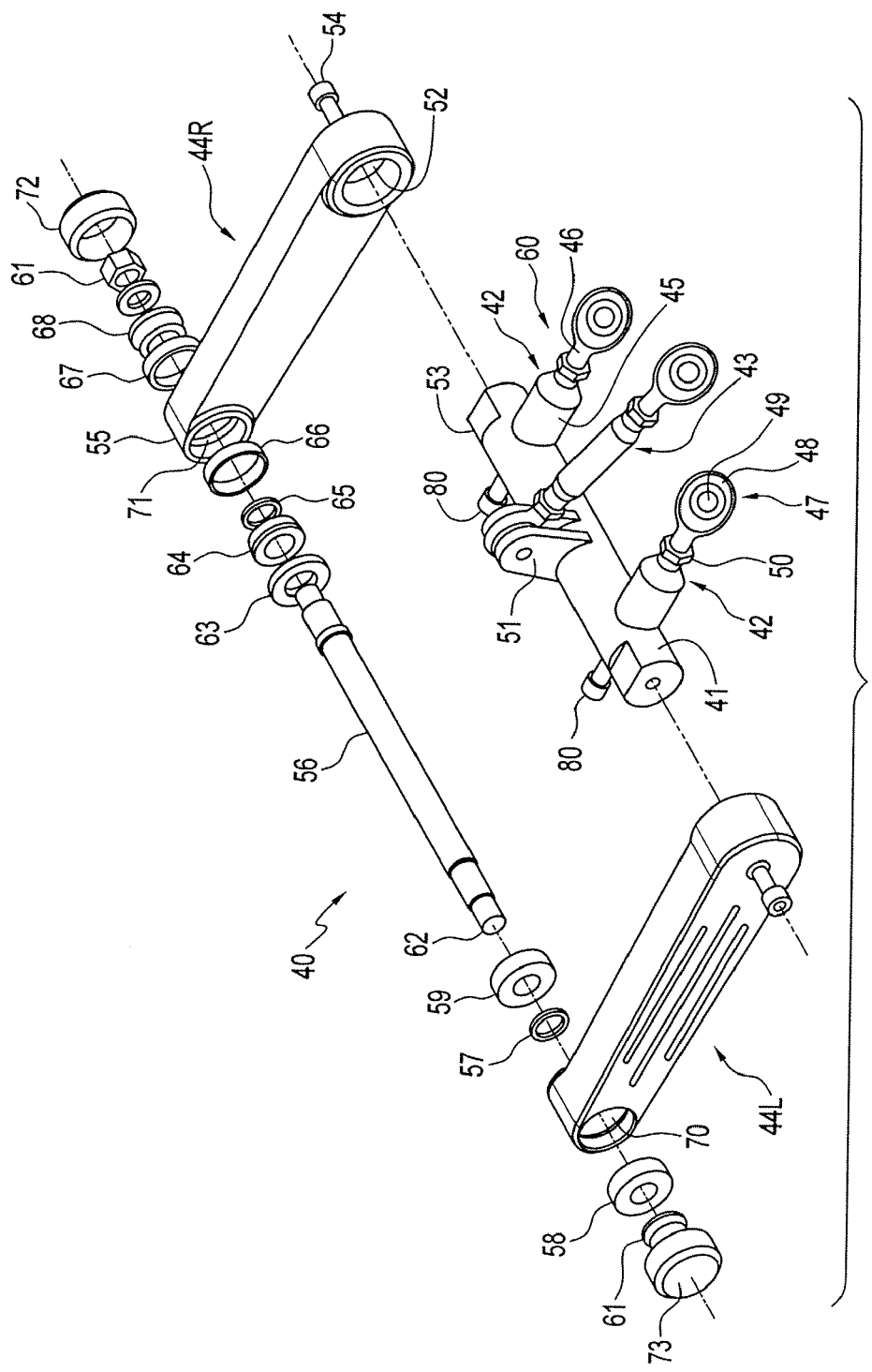
FIG. 5 is a perspective view of the mounting assembly of the present invention.
Figure 6:
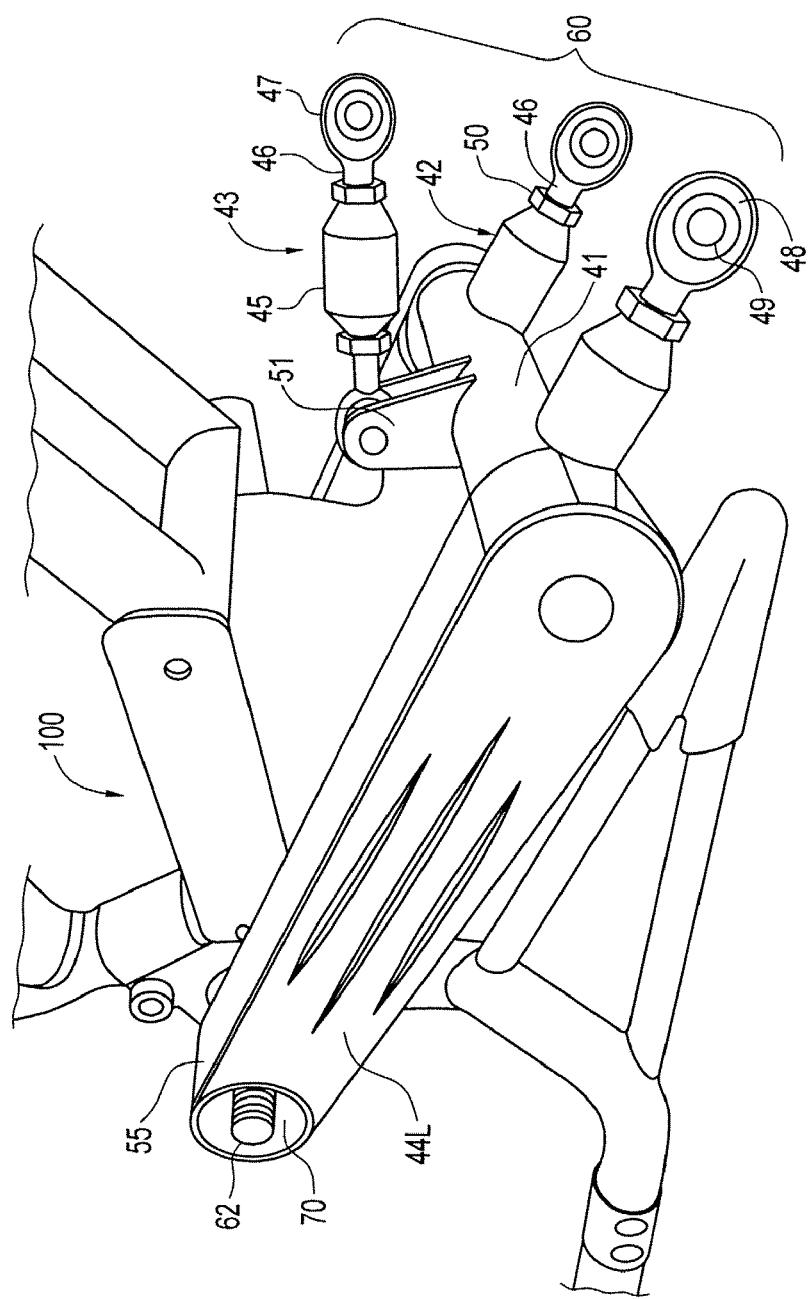
FIG. 6 is a perspective view of the mounting assembly connected to a motorcycle frame.
Figure 7:
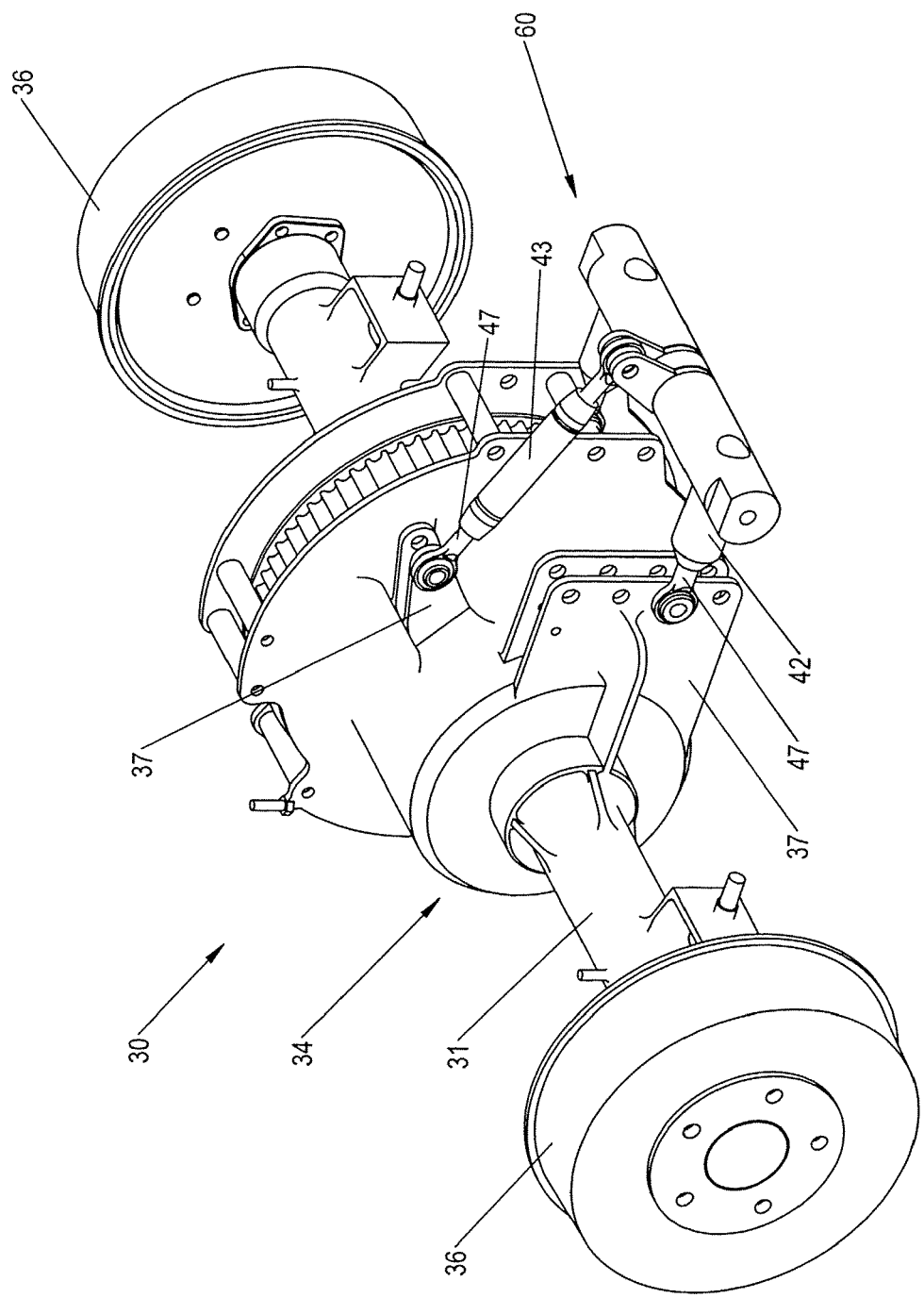
FIG. 7 is a perspective view of the mounting assembly connected to a motorcycle rear axle assembly.

FIGS. 5-7 depict an alternate embodiment comprising mounting assembly 40. Mounting assembly 40 is a modification of the mounting assembly 1 shown in FIGS. 1-4 and in the embodiment shown, is designed to be utilized with Harley Davidson V-Rod model motorcycles. As seen in FIG. 5, mounting assembly 40 includes as its main components swing arm shaft assembly 60, left and right arm extensions 44L, 44R, and front or frame shaft 56.

Swing arm shaft assembly 60 is generally composed of main shaft 41, arms 42, a pair of ears 51, and third link 43. Arms 42 are designed and function in the same as left and right arms 10L, 10R discussed in the previously described embodiment. Arms 42 generally comprise outer tubes 45, threaded shafts 46, and pivotal connectors 47. In one embodiment, pivotal connector 47 will be a conventional heim joint 47 which includes eye ring 48, swivel ball 49 and lock nut 50. Arms 42 extend from main shaft 41 and are rigidly attached to main shaft 41 by a conventional means such as welding. In one embodiment, bolts 80 will pass through main shaft 41 and engage arms 42 in order to help secure and align arms 42 prior to welding. In the presently described embodiment, mounting assembly 40 does not include an intermediate member (e.g. the connector plate 11 discussed in reference to mounting assembly 1) connecting arms 42. However, it can be seen how main shaft 41 serves a similar structural function and the scope of the present invention includes other embodiments of mounting assembly 40 which could include an intermediate member similar to the connector plate 11 discussed above. Main shaft 41 is generally cylindrical in shape and has "D" shaped ends as will be further explained below. In the present embodiment, a pair of ears 51 are connected to main shaft 41. However, it should be obvious that if an alternate intermediate member is used in other embodiments, then the pair of ears 51 could be connected to the intermediate member in a similar fashion to that shown in FIG. 2.

Third link 43 is designed and functions in a similar manner as third link 5 explained in reference to FIG. 2. As best seen in FIG. 6, third link 43 will have an outer tube 45 with threaded shafts 46 extending therefrom and pivotal connectors 47 on the end of threaded shafts 46. The lock nuts 50 described above will serve to lock the degree to which threaded shafts 46 extend from outer tube 45. Third link 43 connects to the pair of ears 51 in the same fashion that third link 5 connects to the pair of ears 21 in the previously described embodiment.

Mounting assembly 40 further includes left arm extension 44L and right arm extension 44R. Left and right arm extensions 44L, 44R function as extensions by indirectly connecting the swing arm shaft assembly 60 to motorcycle frame 100. As depicted in FIG. 5, arm extensions 44L, 44R each have a rearward end 52 and a forward end or frame end 55. The rearward ends 52 have "D" shaped receiving socket for receiving insertion ends 53 of main shaft 41. Insertion ends 53 of main shaft 41 are correspondingly "D" shaped in order to fit into the sockets of rearward ends 52 with a key/keyhole type fit. The "D" shaped insertion and socket ends 53, 52, when assembled together, prevent main shaft 41 and arm extensions 44L, 44R from pivoting relative to one another. Although insertion and socket ends 53, 52 are "D" shaped, it should be obvious to one of ordinary skill in the art that these elements may be any shape capable of preventing the main shaft 41 and arm extensions 44L, 44R from pivoting relative to one another. Other conventional means of preventing pivoting such as bolts or pins passing through the arm extensions 44L, 44R and main shaft 41 should be considered within the scope of the present invention. In the embodiment illustrated in FIG. 5, arm extensions 44L, 44R are secured to main shaft 41 using bolts 54, but could also be attached in any other conventional manner.

FIG. 6 illustrates how mounting assembly 40 will be assembled to the frame 100 of a motorcycle. Arm extensions 44L, 44R will pivotally connect to frame 100 by way of a pivoting connection. The pivoting connection shown in FIG. 6 includes connecting arm extensions 44L, 44R to frame shaft 56 using a conventional shaft and bearings which are well known within the art. As best seen in FIG. 5, frame shaft 56 will engage rearward or frame ends 55 of arm extensions 44L, 44R in a manner similar to frame pin 112 engaging frame connector 7 as seen in FIG. 3. Spacer 57, nut 61, and bearings 58, 59 are existing Harley Davidson V-Rod parts and will be retained and used in assembling the mounting assembly 40 to the frame 100. Frame ends 55 of arm extensions 44L, 44R each have bearing housings 70, 71 which are circular cut-outs in frame ends 55. Frame shaft 56, which will replace the existing motorcycle swing arm shaft when the motorcycle is converted to a trike, is designed to accommodate the bearing arrangement discussed below. In the illustrated embodiment, bearings 58, 59 and spacer 57 will be positioned in bearing housing 70. Frame end 55 of arm extension 44L will then slide onto frame shaft 56 to a point where a step-up in the diameter of frame shaft 56 prevents bearing 59 from advancing any further. Nut 61 then threads unto threaded end 62 of frame shaft 56 to hold arm extension 44L on the shaft. Cap 73 will attach to the frame end 55 to cover nut 61 as suggested in FIG. 5.

In assembling arm extension 44R to frame 100, the seal 63, bearing 64, bearing 68, spacer 65, race 66, and race 67 are housed in bearing housing 71 of arm extension 44R as suggested in FIG. 5. As with the left side of the frame shaft 56, the right side of frame shaft 56 also has a step-up in diameter and a threaded end 62. In the embodiment shown in FIG. 5, the left and right ends of frame shaft 56 accommodate an existing Harley Davidson bearing assembly. However, the present invention could employ any conventional bearing system which allows free rotation of frame ends 55 on frame shaft 56. As with arm extension 44L, frame end 55 of arm extension 44R will slide onto frame shaft 56 followed by nut 61 which threads onto threaded end 62. Cap 72 will attach to frame end as suggested in FIG. 5.

When assembled to frame 100, mounting assembly 40 is able to pivot about frame shaft 56, subject to the limitations imposed by the existing suspension system (not illustrated) of the motorcycle. As is well known in the art, shock absorbers and other suspension members will connect between frame 100 and the rear axle assembly such as described in U.S. Pat. No. 6,641,154 to Jeffrey Vey, which is incorporated by reference herein. The ability of the swing arm assembly to pivot in combination with a suspension system creates shock absorption among other advantages.

As shown in FIG. 7, swing arm shaft assembly 60 will attach to a two wheel rear axle assembly 30 in a similar manner as mounting assembly 1 discussed in reference to FIG. 4. The heim joints 47 on arms 42 and on third link 43 will be pinned or bolted to gear housing ears 37. Although not explicitly shown in FIG. 7, it will be understood that swing arm shaft assembly 60 will be connected to arm extensions 44L and 44R (as seen in FIG. 6) in order to complete the connection of rear axle assembly 30 to motorcycle frame 100.

While the present invention has been described in terms of specific embodiments, those skilled in the art will recognize many alternate embodiments intended to fall within the scope of the present invention. For example, while mounting assemblies 1, 40 is shown in the figures as being attached to belt driven rear axle assembly 30, those skilled in the art may well adapt mounting assemblies 1, 40 for use with existing shaft driven rear axle assemblies. Additionally, the depiction of a third link does not exclude the use of a fourth or even greater number of additional links. Nor is the pivoting frame connector 7 limited to tubular devices seen in the drawings, but could include a pair of mounting points such as disclosed in U.S. Pat. No. 5,499,689, which is incorporated by reference herein. These and all other such modifications are intended to fall within the scope and spirit of the following claims.

I claim:

1. A mounting assembly for converting a two wheel vehicle to a three wheel vehicle, the mounting assembly comprising:
   a. a swing arm shaft assembly having two arms extending in a first direction, each of said arms having a pivotal connector attached to one end thereof;
   b. a third link having a first end pivotally connected to said shaft assembly and a second end free of said shaft assembly; and
   c. at least two arm extensions connected to said shaft assembly and extending in a direction generally opposite said first direction.

2. The mounting assembly according to claim 1, wherein said arms are extendable.

3. The mounting assembly according to claim 2, wherein said arms and said third link each further comprises an outer tube with a threaded shaft positioned therein.

4. The mounting assembly according to claim 1, wherein said first and second ends of said third link have pivotal connectors attached thereto.

5. The mounting assembly according to claim 4, wherein said pivotal connectors are Heim Joints.

6. The mounting assembly according to claim 1, wherein said pivotal connectors are Heim Joints.

7. The mounting assembly according to claim 1, wherein said shaft assembly comprises a main shaft fixing a position of said arms relative to one another.

8. The mounting assembly according to claim 1, wherein said arm extensions are adapted for connection to the frame of Harley Davidson's V-Rod model motorcycles.

9. The mounting assembly according to claim 1, wherein a length of said third link is adjustable.

10. A three wheel motorcycle frame-axle assembly comprising:
    a. a motorcycle frame having a single front wheel;
    b. a two wheel axle assembly;
    c. a swing arm shaft assembly pivotally connected to said motorcycle frame by at least two arm extensions, said shaft assembly further having three pivotal connectors attaching to said two wheel axle assembly.

11. The frame-axle assembly according to claim 10, wherein said shaft assembly includes two arms and a third link, each of which further comprise an outer tube with a threaded shaft positioned therein.

12. The frame-axle assembly according to claim 11, wherein said two arms are rigidly connected to said shaft assembly.

13. The frame-axle assembly according to claim 12, wherein a first end of said third link is pivotally connected to said shaft assembly and a second end of said third link is connected to a mounting plate fixed to said two wheel axle assembly.

14. The frame-axle assembly according to claim 13 wherein said pivotal connections are made with Heim Joints.

15. The frame-axle assembly according to claim 12, wherein said two arm extensions are pivotally connected to said motorcycle frame and rigidly connected to said shaft assembly.

16. The frame-axle assembly according to claim 15, wherein said arm extensions are adapted for engaging the frames of Harley Davidson's V-Rod model motorcycles.

17. The frame-axle assembly according to claim 10 wherein said pivotal connections are made with Heim Joints.

18. A three wheel motorcycle frame-axle assembly comprising:
   a. a motorcycle frame having a single front wheel;
   b. a two wheel axle assembly; and
   c. a mounting means being connected to said motorcycle frame by at least two arm extensions, said mounting means further including a means for making at least three pivotal connections attaching to said two wheel axle assembly.

19. A method of converting a two wheel motorcycle to a three wheel motorcycle, the method comprising the steps of:
   a. providing a two wheel motorcycle including a frame and a swing arm connecting a rear wheel to said frame;
   b. replacing said swing arm and said rear wheel with a two wheel axle connected to said frame with a mounting assembly, said mounting assembly including:
      i. a swing arm shaft assembly pivotally connected to said motorcycle frame by at least two arm extensions, said shaft assembly further having three pivotal connectors attaching to said two wheel axle assembly.

* * * * *